United States Patent
El-Gasseir et al.

(10) Patent No.: US 9,997,918 B1
(45) Date of Patent: Jun. 12, 2018

(54) SYSTEMS AND METHOD FOR HVDC TRANSMISSION

(71) Applicant: ATLANTIC GRID HOLDINGS LLC, Chevy Chase, MD (US)

(72) Inventors: Mohamed El-Gasseir, Lafayette, CA (US); Harrison K. Clark, Granite Bay, CA (US)

(73) Assignee: ATLANTIC GRID HOLDINGS LLC, Chevy Chase, MD (US)

( * ) Notice: Subject to any disclaimer, the term of this patent is extended or adjusted under 35 U.S.C. 154(b) by 748 days.

(21) Appl. No.: 14/310,935

(22) Filed: Jun. 20, 2014

Related U.S. Application Data

(60) Provisional application No. 61/841,171, filed on Jun. 28, 2013.

(51) Int. Cl.
  *H02J 3/36* (2006.01)
  *H02M 7/04* (2006.01)

(52) U.S. Cl.
  CPC .................. *H02J 3/36* (2013.01); *H02M 7/04* (2013.01); *H02J 2003/365* (2013.01)

(58) Field of Classification Search
  CPC ........ H02J 3/36; H02J 2003/365; H02J 3/382; H02J 3/386; H02M 7/04
  See application file for complete search history.

(56) References Cited

U.S. PATENT DOCUMENTS

| | | | |
|---|---|---|---|
| 6,479,907 B1 | 11/2002 | Erikson et al. | |
| 8,120,202 B2 | 2/2012 | Larsen | |
| 8,373,307 B2 | 2/2013 | Sihler et al. | |
| 8,717,786 B2 * | 5/2014 | Asplund | H02J 3/36 363/37 |
| 2009/0146603 A1 * | 6/2009 | Sihler | H02M 3/158 318/812 |
| 2009/0279328 A1 | 11/2009 | Jiang-Häfner | |
| 2009/0309421 A1 | 12/2009 | Ängquist et al. | |
| 2010/0156189 A1 * | 6/2010 | Fishman | H02J 3/36 307/77 |
| 2011/0215640 A1 | 9/2011 | Donnelly et al. | |
| 2012/0089261 A1 | 4/2012 | Kim | |
| 2012/0126623 A1 * | 5/2012 | Koehl | H02J 3/383 307/76 |
| 2012/0150679 A1 * | 6/2012 | Lazaris | G06Q 30/0605 705/26.2 |

(Continued)

OTHER PUBLICATIONS

Reactive Power, An Introduction to Reactive, The National Grid Company plc, Market Development, pp. 1-3. Oct. 2001.

*Primary Examiner* — Jared Fureman
*Assistant Examiner* — Michael Warmflash
(74) *Attorney, Agent, or Firm* — Winston & Strawn LLP

(57) ABSTRACT

A system and method are provided for enabling multi-functional support of an extant synchronous alternating current (AC) grid. At least one extant electricity source and at least one extant electricity sink are connected by two or more high-voltage direct current (HVDC) transmission circuits connected in turn in series with each other with at least one pair of HVDC circuits interconnected through an intervening high-voltage AC (HVAC) point of interconnection. One or more of the HVDC transmission circuits includes a 2-terminal or a multi-terminal transmission link. A 2-terminal HVDC circuit is dedicated to connecting with the electricity sources and sinks.

20 Claims, 4 Drawing Sheets

(56) References Cited

U.S. PATENT DOCUMENTS

| | | | | |
|---|---|---|---|---|
| 2012/0261917 | A1* | 10/2012 | Egedal | F03D 7/026 290/44 |
| 2012/0267955 | A1* | 10/2012 | Zhan | H02J 1/06 307/31 |
| 2012/0327693 | A1* | 12/2012 | Cousineau | H02P 9/48 363/35 |
| 2013/0127426 | A1* | 5/2013 | Berggren | H02J 1/102 323/234 |
| 2013/0197704 | A1* | 8/2013 | Pan | H02J 3/36 700/287 |
| 2013/0258724 | A1* | 10/2013 | Shen | H02J 3/36 363/35 |

* cited by examiner

SYSTEMS AND METHOD FOR HVDC TRANSMISSION

CROSS-REFERENCE TO RELATED APPLICATIONS

This application claims the benefit of provisional application 61/841,171 filed Jun. 28, 2013, the entire content of which is expressly incorporated herein by reference thereto.

FIELD OF TECHNOLOGY

The present invention relates to a system and method for transferring electrical energy from generating plants to customers.

BACKGROUND

As energy consumption rises, the control of voltage at generating plants remains a challenge to improved stability of such plants. To ensure uninterrupted generation and delivery of power, enhancement of grid reliability may be realized by taking a number of actions including, but not limited to: (i) resolving local and regional reliability problems; (ii) minimizing the potential for common mode failures associated with major disturbances and, or large-scale events such as weather-related phenomena; and (iii) sharing resources by interconnecting distant synchronous networks.

Technical limitations inherent to AC systems, however, have increasingly rendered such measures ineffective. For load zones, such conditions arise when the local network reaches a level of maturity (density) that prevents the addition of either generation or AC circuits without causing short-circuit capacity problems. For networks connecting generation clusters, the AC limitations may manifest themselves in overvoltage and N-1 and N-1-1 operational constraints. Moreover, AC interconnection of control areas can at times be counterproductive when it leads to exacerbating the common mode failure problem for the larger grid.

A need therefore exists to avoid AC limitations on enhancing grid reliability.

SUMMARY

The presently disclosed invention is directed to a system and method for enabling multi-functional support of an extant synchronous alternating current (AC) grid. The system includes at least one extant electricity source and at least one extant electricity sink connected by two or more high-voltage direct current (HVDC) transmission circuits. The circuits are connected in turn in series with each other with at least one pair of HVDC circuits interconnected through an intervening high-voltage AC (HVAC) point of interconnection. One or more of the HVDC transmission circuits includes a 2-terminal or a multi-terminal transmission link. A 2-terminal HVDC circuit is dedicated to connecting with the electricity sources and sinks.

Each transmission link may be selected from underground transmission, a combination of overhead and underground transmission and submarine transmission. The electricity source may include one or more generators, and the electricity sink may include a load zone. In some embodiments, at least one additional generator may complement the generators of the electricity source. One terminal of each 2-terminal transmission link includes an AC-DC voltage sourced converter placed proximate the electricity source to absorb reactive power produced thereby.

In some embodiments, the transmission link may use a route passing through at least one intervening HVAC network so as to enable future connections of an HVDC link with the at least one intervening HVAC network. In other embodiments, the transmission link may use a route passing through at least one variable energy resource zone so as to enable future connections of an HVDC transmission link with HVAC generation ties from the variable energy resource zone.

In additional embodiments, the transmission link may use a route passing through at least one intervening HVAC network. In such embodiments, an HVDC link is bifurcated into two or more HVDC transmission links at one or more points of interconnection with the intervening HVAC network. This configuration enables picking up generation from variable energy resources in addition to energy from the extant electricity source.

An HVDC transmission link may be bifurcated into two HVDC transmissions links at one or more points of interconnection with the intervening HVAC networks. Power is passed from one HVDC transmission link to its contiguous link via intervening AC circuitry at an intersection of the HVDC transmission link and its contiguous link.

In some embodiments, the system may include a submarine transmission system that can collect power from one or more offshore wind farms in an offshore region. Each wind farm delivers wind energy to platform-based HVDC converter stations along a submarine route. Each wind farm may include at least one wind turbine generator coupled with at least one AC-to-DC converter that is in communication with a common HVDC transmission line. The HVDC transmission line is bifurcatable between extant substations so as to be brought into communication with corresponding substation platforms that support at least one HVDC converter that receives electrical energy from the at least one wind turbine generator. The HVDC transmission line transfers the electrical energy to one or more of the extant substations and any additional substation.

A method is provided for enabling multi-functional support of an extant synchronous alternating current (AC) grid. The method includes, in the presently disclosed system, connecting at least one extant electricity source and at least one extant electricity sink by an HVDC transmission link. The HVDC transmission link is selectively and progressively bifurcated into two or more HVDC circuits. Each circuit includes one or more 2-terminal transmission links interconnected through one or more HVAC networks. In some embodiments, the method may also include placing an AC-DC voltage sourced converter proximate the at least one electricity source to absorb reactive power produced thereby. In such embodiments, the AC-DC voltage sourced converter includes one terminal of a 2-terminal transmission link.

The method may also include determining, by a processor, that electrical power generated by the electricity source is less than a determined amount. In response, the power that is collected by the submarine transmission system is supplied from at least one offshore wind farms.

Additional aspects of the presently disclosed invention will be made apparent from the following detailed description.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

Figure 1:
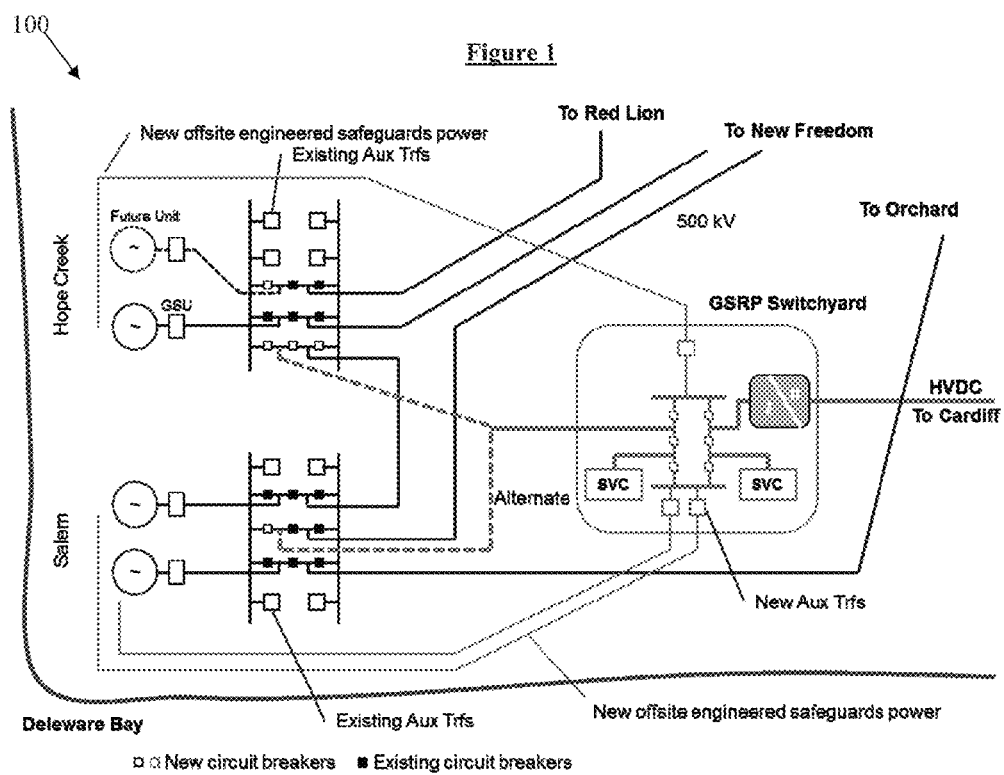
FIG. 1 shows an exemplary system 100 for an HVDC transmission line termination relative to a generator complex having a plurality of generator units located thereat.

The APPENDIX submitted shows an exemplary overview of complementary HVDC transmission lines with substations interconnected thereby.

DETAILED DESCRIPTION

Two methods for developing an evolving apparatus of transmission equipment ultimately include two or more high-voltage direct current (HVDC) transmission lines and associated facilities in a complementary arrangement which solves multiple alternating current (AC) grid problems, including congestion, reliability and safety issues that cannot be practicably resolved by conventional transmission methods. One methodology starts with the design of a single, 2-terminal HVDC link connecting a distant extant electricity source with an extant electricity sink to solve extant grid reliability problems, followed by coordinated bifurcation of the link at optimal locations to access intervening electricity sinks and variable electricity sources to serve local loads and efficiently integrate the variable energy resources within the transfer capability limits of the HVDC system and the extant AC grid. The second methodology starts with two or more HVDC links interconnected to the grid separately (e.g., at two different sets of Points of Interconnection (POIs)), with one link being a 2-terminal HVDC circuit connecting an extant electricity source to an electricity sink to solve reliability problems associated with the extant electricity source, and the second link starting initially as a 2-terminal HVDC circuit connecting an extant electricity sink representing a constrained load zone to a point of interconnection in the vicinity of the electricity sink of the first HVDC link to solve reliability problems in the extant electricity sink (load zone).

Depending on the circumstances of the situation (e.g., the urgency and the topology of the problems to be resolved, available resources, regulatory factors, etc.), incremental integration of the HVDC links may be carried out in a progressive bifurcation method. In a progressive bifurcation method, a single, 2-terminal HVDC link is designed to connect an electricity source and an electricity sink that are electrically distinct, with one or both at risk of reliability problems. The link is progressively bifurcated at one or more optimal locations and in a coordinated manner into a series (chain) of two or more HVDC circuits consisting of 2-terminal links and/or multi-terminal links to access intervening electricity sinks and variable energy sources to serve local loads and efficiently integrate the variable resources within the transfer capability limits of HVDC system.

With a progressive bifurcation method as disclosed herein, the progressive development of an HVDC transmission link connects an electricity source including generating plant(s), and an electricity sink having of a load zone, into two or more HVDC links interconnected through high-voltage AC (HVAC) network(s) to solve multiple extant AC grid transmission problems and to efficiently integrate variable energy resources into the extant AC grid. Depending upon environmental constraints, reliability and safety requirements, and the topology of the extant AC grid, each such HVDC transmission link can be either underground, a combination of overhead and underground transmission or predominantly submarine, both with the required combination being determined by reliability and safety needs.

Using such a configuration, voltage at the generating plant(s) is controlled in a manner that improves the stability of such plant(s) through increased generator excitation. An AC-DC voltage sourced converter acts as one terminal of the 2-terminal HVDC transmission circuit and is placed in close proximity to the electricity source power plant(s) to absorb reactive power produced by the generator(s), thereby increasing excitation and improving stability. In addition, power on AC transmission lines emanating from extant power plant(s) may be offloaded at the electricity source. Such a feature increases the stability margin of the AC transmission system and allows increased generation at the power plant(s) with reduced operating constraints and/or the elimination (or less frequent use) of existing stability aids that are considered unreliable and therefor undesirable. An increase in the capability of the extant generator(s) at the extant power plant(s) may therefore be accommodated, including potentially the addition of new generator(s).

The presently disclosed method realizes delivery of electrical power from extant generating plant(s) (e.g., the electricity source) to extant sink(s) having load zone(s) in need of new sources of electrical energy but constrained at least by (a) lack of available rights of way (ROW) for new transmission and/or by (b) extant problematic short-circuit levels that prohibit placement of new AC transmission and/or generation in the constrained load zone(s). With the negligible short-circuit levels of the HVDC transmission method presently disclosed herein, the HVDC link is used to import generation, thereby replacing local generating units.

A 2-terminal HVDC transmission link may connect the extant electricity source and extant electricity sink situated in one or more HVAC networks. In addition, a 2-terminal HVDC transmission link can uses a routing scheme and flexible architecture to solve progressively multiple extant AC grid transmission problems and meet developing generation integration and power delivery needs. A 2-terminal HVDC transmission link that connects an extant electricity source and extant electricity sink (e.g., load zone) uses a route passing through at least one intervening HVAC network in a manner that enables future connections of the HVDC link with the intervening HVAC network(s) to serve additional load zones. In addition, a 2-terminal HVDC transmission link that connects an extant electricity source and extant electricity sink uses a route passing through at least one variable energy resource zone in a manner that enables future connections of the HVDC link with HVAC generation ties from variable energy resource zone(s) to transmit produced variable generation to the HVDC-connected load zones.

In an alternative progressive integration method, two or more 2-terminal HVDC links are interconnected to the grid separately at different pairs of POIs (or at common POIs but not at the same AC bus) in a manner that will enable scheduling of feasible simultaneous loading of converters and lines of all links. One of the starter links connects an electricity source and an electricity sink to solve reliability problems associated with the electricity source, and another link connects an electricity sink representing a constrained load zone to a point of interconnection in the vicinity of the electricity sink of the first HVDC link to solve reliability problems for both the electricity source served by the first link and the constrained load zone served by the second link. New terminals are progressively added to the link(s) connected to electricity sink(s) to pick up and offload variable generation within the available transfer capability of the HVDC system.

Figure 2:
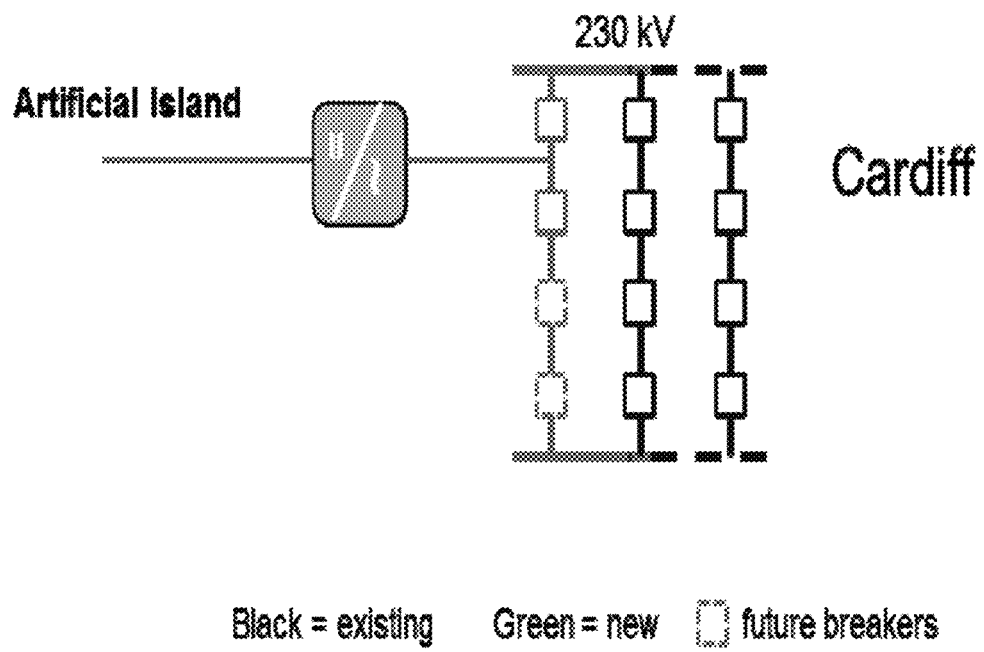
FIG. 2 shows exemplary terminal equipment for a generator unit.

Now referring to the figures, wherein like numbers represent like elements, FIG. 2 shows an exemplary system 100 for an HVDC transmission line termination relative to a generator complex having a plurality of generator units located thereat. The generator complex may be connected to the remainder of system 100 by four 500-kV lines: three going north to New Freedom substation and one going west to Red Lion Substation. The operation of the generator units is hampered by angular stability and voltage constraints that arise when one of the four lines is out of service, either because of a forced outage or due to scheduled maintenance. This condition can lead to the imposition of onerous operating constraints and undesirable actions such as generator tripping.

To improve operation and reliability of the generator complex, system 100 addresses the elimination of instability that results from certain contingencies and the elimination of high voltages in the 500-kV system during normal operation. A feature of system 100 is a 2-terminal HVDC transmission link connecting an extant electricity source and an extant electricity sink, and using a route passing through at least one intervening HVAC network. The 2-terminal HVDC link is bifurcated into two or more HVDC transmission links at one or more points of interconnection with one or more intervening HVAC networks. Power is passed from one HVDC transmission link to its contiguous link via an intervening AC circuitry at their intersection. Such configuration enables "pickup" of generation from variable energy resources, in addition to the energy from the extant electricity source, for delivery to the POIs. Using HVDC controllability, delivery matches scheduled transfers within applicable loading limits and without violating prevailing reliability criteria.

In some embodiments, a submarine transmission system can collect power from offshore wind farms in an offshore region where wind conditions are excellent for energy production. Groups of wind farms can each deliver wind energy to platform-based HVDC converter stations along the submarine route. This feature solves the problem of bringing transmission systems ashore where the extant AC grid is unable to support that power injection without significant upgrade in highly populated areas. The controllability of HVDC allows the wind power to be injected at its limited number of shore connections to the extent each can accommodate that wind power and its variability.

System 100 includes an underground 1000 MW VSC-based HVDC transmission line from the generator complex ("Artificial Island") to a generator unit at Cardiff (hereinafter "Cardiff") and a supplement of 1,000 Mvars of SVCs placed at the generator complex. The HVDC converters are assumed to be of the VSC type. They are rated at 1,100 MVAs each and can produce up to +/−458 Mvars per converter while transmitting 1,000 MWs. The VSCs at the generator complex may be a combination of mechanically or thyristor-switched capacitors and thyristor-controlled shunt reactors. The mechanically switched capacitors can include harmonic filters. To ensure maximum reliability, use of two 500-Mvar SVC banks is presumed instead of a single assembly of the required 1000 Mvars.

Some of the SVCs may be located at another generator unit located at New Freedom (hereinafter "New Freedom"). In some embodiments, this option may increase the total required SVC capability beyond 1,000 Mvars. Additionally, use of VSC-based SVCs can reduce the SVC footprint although at a higher cost. The existing generator unit at Cardiff was found sufficient to absorb the 1000-MW output of the proposed HVDC transmission line.

Further referring to FIG. 2, a proposed substation arrangement for the HVDC transmission line termination is shown. A preliminary interconnection arrangement is provided for a terminal of the generator complex, including the placement of the circuit breakers and the SVC banks. An offsite auxiliary power feeds from a VSC converter, identified as the new engineered safeguard power supply for all generating units of the generator complex. This feature ensures redundancy to the current offsite power supply system serving the generating units. This feature additionally provides the option to connect the HVDC transmission line termination using available circuit breaker bays at a generator unit located at Salem (hereinafter "Salem") and/or a generator unit located at Hope Creek (hereinafter "Hope Creek") as shown in FIG. 1.

Now referring to FIG. 2, exemplary terminal equipment for a generator unit (e.g., such as Cardiff) is shown. An existing 230 kV bus arrangement is an eight-breaker ring. An option would be a conversion to a "modified ring" thereby providing additional four circuit breakers and three line termination points. The "buses" shown in FIG. 2 would continue to serve the 138-kV system as they do currently.

Figure 3:
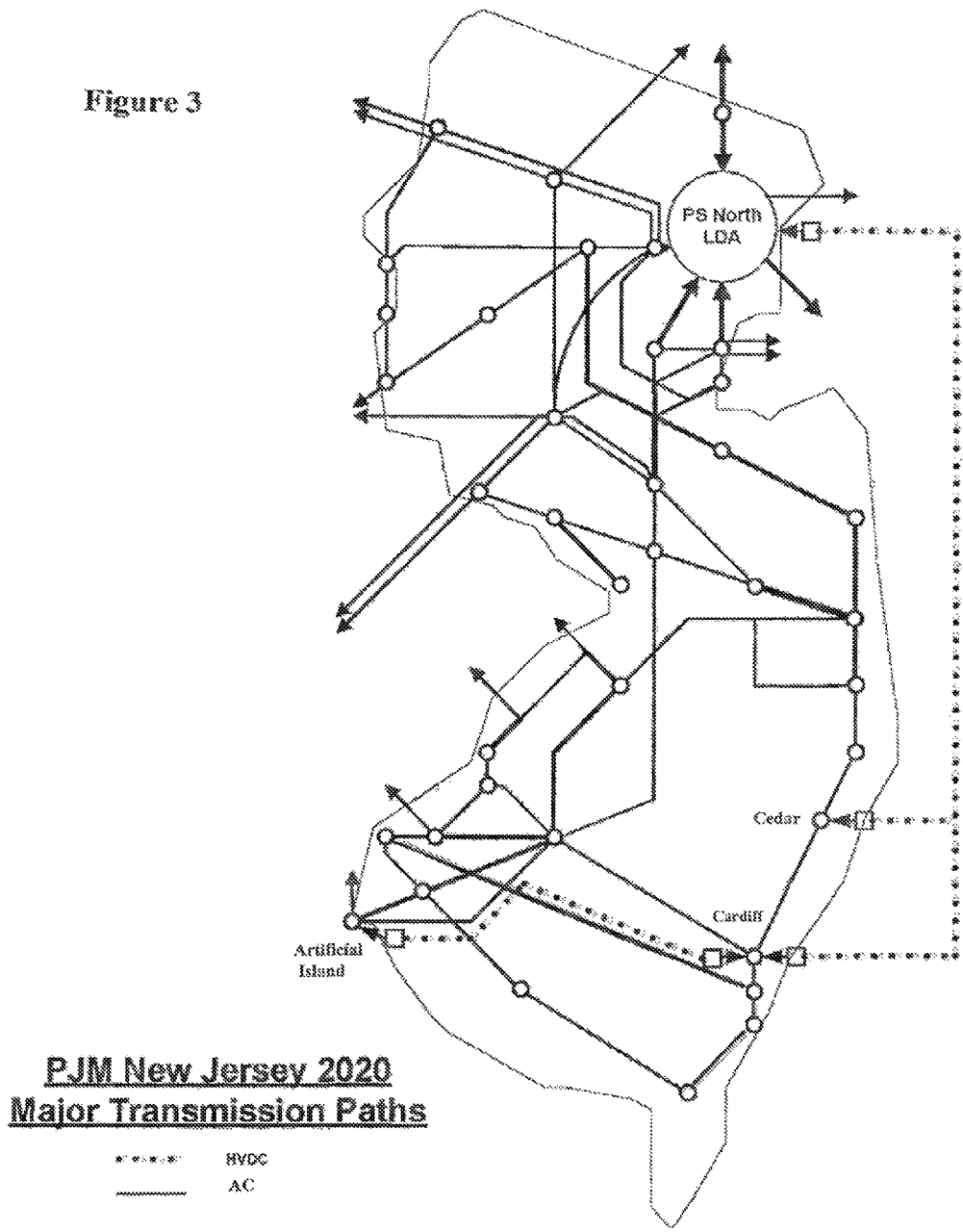
FIG. 3 shows an exemplary HVDC, VSC-based transmission system connecting a selected generator unit with a selected substation.

As shown in FIG. 3, a mostly submarine HVDC, VSC-based transmission system connects the Cardiff generator with a substation (e.g., Hudson Substation). Thus, a common POI is realized, as shown. As the single line diagram shows, the two proposed circuits effectively constitute a VSC-based transmission backbone (e.g., for the state of NJ) and essentially for a northern flank of the East grid.

Figure 4:
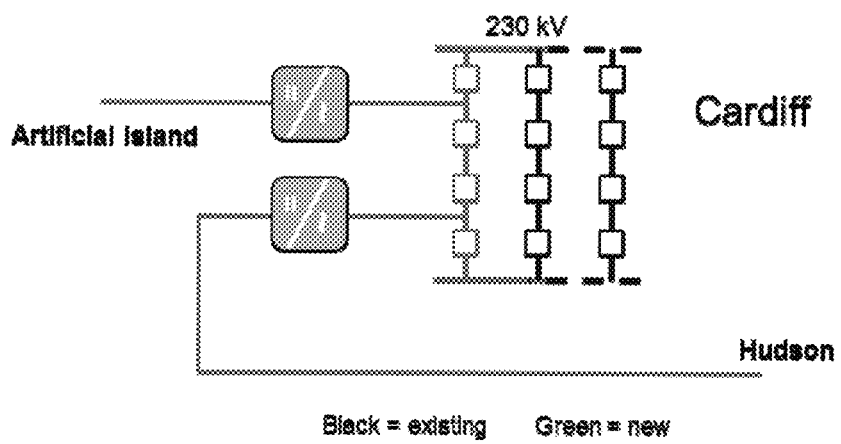
FIGS. 4 and 5 show exemplary face-to-face substation arrangements according to embodiments of the presently disclosed invention.

In view of the importance of the generator complex to system 100 and neighboring systems, interconnection in series is realized in a face-to-face (rather than in a back-to-back) configuration as shown in FIG. 4. This arrangement preserves the nature of the circuit as a standalone, 2-terminal VSC system, and eliminates any threat of a DC fault bringing down system 100. Simply put, the AC tie between the two converters at the Cardiff generator unit will act as an AC breaker. To further ensure the reliability of both HVDC systems, the full four circuit breakers would be installed with the center bay unused (See FIG. 5.) The two circuit breakers in series would ensure that a stuck breaker would not take both HVDC lines out of service.

Figure 5:
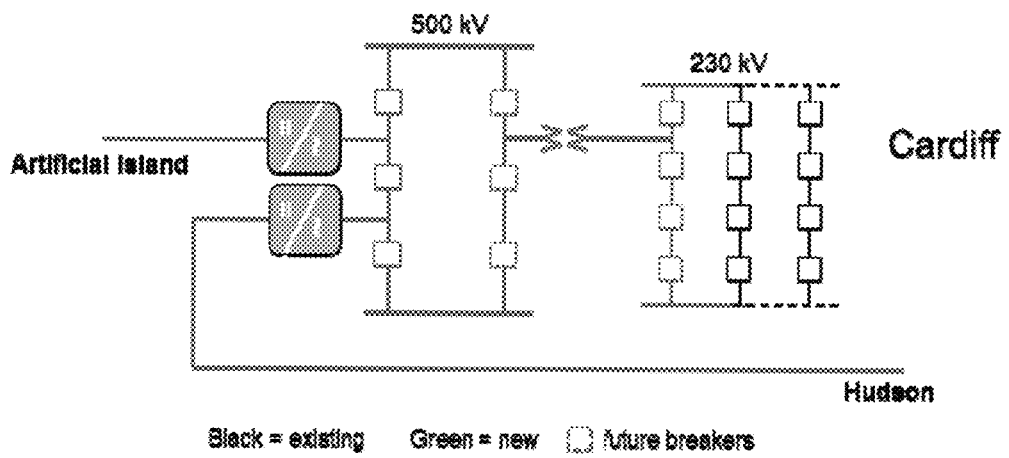

In an exemplary embodiment, the presently disclosed system is designed to deliver as much as 2,000 MWs of offshore wind energy in Southern N.J. (this can be inferred from the two landing points displayed in FIG. 3 as the two POIs at "Cardiff" and "Cedar"). This prospect, and additional landings in Southern N.J., may necessitate upgrading certain 230-kV ties into 500-kV circuits. Under these circumstances, prudent design may require a 500-kV face-to-face interconnection as represented by FIG. 5.

Example

For N-1 contingencies that were specified, the effectiveness of the presently disclosed system was examined with respect to containing the instability of such these contingencies. Plant output was expected to sustain output at 3818

MW during a 500 kV line outage without problematic operating constraints and while continuing to meet voltage and angular stability criteria.

Many N-1-1 contingencies resulted in the generator unit at the generator complex going transiently unstable. For each of these contingencies, the simulation results with the presently disclosed system are shown in Table 1.

disturbance that could trigger cascading and subsequent load shedding and blackouts. This investigation established the system could withstand the simultaneous loss, due to a DC fault, of as much as 4,000 MWs of offshore wind generation running at full load on a single HVDC circuit. This result is not surprising considering the fact that the HVDC backbone is designed to inject the wind energy through several POIs

TABLE 1

Simulation Results for Contingencies That Are Unstable Without System

| Prior Outage* | Contingency | Maximum Al Rotor Angle Excursion (Degrees) | Al Transient 500 kV Voltage (Per Unit) | Lowest Al Steady-State 500 kV Voltage (Per Unit) | Lowest Al Steady-State Terminal Voltage (Per Unit) | Pre/post Al Voltage Drop** | Damping |
|---|---|---|---|---|---|---|---|
| | NC2A | 46.525 | 1.035 | 1.050 | 0.977 | NA | 20.110 |
| | NC1A | 56.348 | 0.934 | 1.043 | 0.977 | NA | 11.922 |
| | NC3A | 58.961 | 0.947 | 1.050 | 0.977 | NA | 17.685 |
| | NC3B | 44.449 | 1.005 | 1.050 | 0.977 | 0.000 | 18.447 |
| | NC4 | 53.897 | 0.971 | 1.050 | 0.977 | NA | 15.823 |
| | NC5A | 56.347 | 0.934 | 1.043 | 0.977 | NA | 11.979 |
| | NC5B | 46.293 | 0.944 | 1.046 | 0.977 | 0.000 | 14.129 |
| | NC6A | 58.332 | 0.950 | 1.050 | 0.977 | NA | 18.094 |
| | NC7A | 55.506 | 0.972 | 1.049 | 0.977 | NA | 16.048 |
| | NC7B | 64.030 | 0.903 | 1.049 | 0.977 | NA | 15.764 |
| | NC8 | 54.179 | 0.970 | 1.050 | 0.977 | NA | 16.541 |
| | NC9B | 47.300 | 1.015 | 1.049 | 0.977 | NA | 13.374 |
| | NC11B | 47.938 | 1.028 | 1.049 | 0.977 | NA | 32.186 |
| | NC12A | 70.337 | 0.948 | 1.049 | 0.977 | NA | 8.837 |
| | NC12B | 84.949 | 0.796 | 1.049 | 0.977 | NA | 8.042 |
| | NC12C | 93.124 | 0.738 | 1.049 | 0.977 | NA | 5.721 |
| | NC12D | 45.673 | 1.043 | 1.049 | 0.977 | NA | 35.672 |
| | NC7B | 63.207 | 0.964 | 1.044 | 0.976 | NA | 22.741 |
| | NC2A | 51.791 | 1.035 | 1.049 | 0.977 | NA | 11.895 |
| | NC2B | 60.351 | 1.002 | 1.049 | 0.977 | NA | 8.900 |
| | NC10B | 47.989 | 1.045 | 1.049 | 0.977 | NA | 12.275 |
| | NC1A | 51.043 | 0.997 | 1.045 | 0.977 | NA | 40.684 |
| | NC2A | 48.161 | 1.031 | 1.049 | 0.977 | NA | 19.156 |
| | NC5A | 51.114 | 0.997 | 1.045 | 0.977 | NA | 41.194 |

*Maintenance outage or prior N-1 event.
**Applies to cases involving trip of a generator unit. NA (not applicable) designates cases that do not involve such a trip.

These results reveal the presently disclosed system as a constructible alternative capable of rendering the grid stable in the aftermath of either event. The employment of the presently disclosed system produces the following effects:
  The generator units in the generator complex remain in synchronism (with rotor angle deviation less than 120 degrees);
  Generator complex voltages staying within their transient and steady-state limits; and
  3% or better positive damping for all contingencies studied.

In all cases there is a safety margin in the achievement of each criterion.

As evidenced herein, the presently disclosed HVDC transmission line will off-load the existing AC circuits by 1000 MW, thereby helping accommodate all potential AC outages. For example, the transmission line makes the generator complex stable at 3,818 MW for one or more contingencies consisting of a prior outage. With the transmission line in service, the contingencies are not only stable but also do not cause thermal overloads or voltage violations. Additionally, generator units in the generator complex would only need to be run back to 1000 MW total to prepare for yet the next most severe contingency.

Associated findings with respect to the presently disclosed system reveal that a DC fault would not result in a major with the rid. The distributed delivery system does not subject the grid to supply disruption at any one location greater than 1,000 MWs. It should be noted that in the case of system 100, by virtue of its being a 2-terminal system with cable transfer capability limited to 1000 MWs, no fault will disrupt power flow greater than 1,000 MWs.

HVDC power flows are easily and quickly controlled to assist with ac system contingencies. The presently disclosed system can therefore provide several benefits beyond correcting the stability and operating issues at the generator complex. A truly redundant off-site auxiliary power supply is provided to improve the reliability and safety of the plant engineered safeguards systems. The system will address reliability, mitigate short circuit inadequacy, increase access to other suppliers of energy and capacity to constrained grids and reduce the costs of accessing and delivering offshore wind energy, all in an integrated and cost effective manner. Shipping 1000 MW from the generator complex via the combined HVDC circuits will relieve loadings and preempt many upgrades in the AC network to accommodate the heavy flow. The combination of the two circuits carrying 1000 MW northward has regional benefits, significantly reducing loading of AC transmission circuits.

As disclosed herein, incremental integration of HVDC links enables effective implementation of resolving local and regional reliability problems, minimizing the potential for common mode failures involving major disturbances (e.g., due to large scale events such as weather-related phenomena) and sharing resources by interconnecting distant synchronous networks. HVDC transmission employing voltage-sourced converters (VSCs) can accomplish this because it reduces short circuit contribution and facilitates transmission routing not practicable with AC transmission (e.g., developing offshore rights of way (ROWs) and long buried-cable runs). HVDC transmission as disclosed herein also enables controllability of the magnitudes and direction of power flow and further enables the production and consumption of reactive power. It is resistant to, and can survive, cascading, is capable of providing black start during major blackouts and is immune to the effects of electromagnetically induced disruptions.

As used herein, the term "process" or "method" may include one or more steps. Any sequence of steps is exemplary and is not intended to limit methods described herein to any particular sequence, nor is it intended to preclude adding steps, omitting steps, repeating steps, or performing steps simultaneously.

The dimensions and values disclosed herein are not to be understood as being strictly limited to the exact numerical values recited. Instead, unless otherwise specified, each such dimension is intended to mean both the recited value and a functionally equivalent range surrounding that value as well as equivalent units of that value. For example, a dimension disclosed as "40 mm" is intended to mean "about 40 mm" as well as "1.58 inches". The disclosure of such dimensions and values, however, shall not preclude use of any of disclosed devices having dimensions and values outside of the prescribed ranges.

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the invention has been described in a preferred form, it will be understood that changes, additions, and modifications may be made to the respective articles forming the invention. Accordingly, no limitation should be imposed on the scope of this invention, except as set forth in the accompanying claims.

What is claimed is:

1. A system for enabling multi-functional support of an extant synchronous alternating current (AC) grid, comprising:
   at least one extant electricity source and at least one extant electricity sink connected by two or more high-voltage direct current (HVDC) transmission circuits connected in turn in series with each other with at least one pair of HVDC transmission circuits interconnected through an intervening high-voltage AC (HVAC) point of interconnection;
   wherein one or more of the HVDC transmission circuits comprises a 2-terminal or a multi-terminal voltage-sourced converter-based HVDC transmission link that connects geographically dispersed elements; and
   wherein a 2-terminal HVDC transmission circuit is dedicated to connecting with the electricity sources and sinks.

2. The system of claim 1, wherein each transmission link may be selected from underground transmission, a combination of overhead and underground transmission and, or submarine transmission.

3. The system of claim 1, wherein the at least one electricity source comprises one or more generators and the at least one electricity sink comprises a load zone.

4. The system of claim 3, further comprising at least one additional generator that complements the one or more generators of the at least one electricity source.

5. The system of claim 1, wherein one terminal of each 2-terminal transmission link comprises an AC-DC voltage-sourced converter placed proximate to the at-least one electricity source to absorb reactive power produced thereby.

6. The system of claim 1, wherein the transmission link uses a route comprising one or more of:
   a route passing through at least one intervening HVAC network so as to enable future connections of an HVDC link with the at least one intervening HVAC network;
   a route passing through at least one renewable energy resource zone so as to enable future connections of an HVDC transmission link with HVAC generation ties from the at least one renewable energy resource zone; and
   a route passing through at least one intervening HVAC network where an HVDC link is bifurcated into two or more HVDC transmission links at one or more points of interconnection with the at least one intervening HVAC network so as to enable picking up generation from renewable energy resources in addition to energy from the extant electricity source.

7. The system of claim 6, wherein an HVDC transmission link is bifurcated into two HVDC transmissions links at one or more points of interconnection with one or more intervening HVAC networks, and wherein power is passed from one HVDC transmission link to its contiguous link via intervening AC circuitry at an intersection of the HVDC transmission link and its contiguous link.

8. The system of claim 1, further comprising a submarine transmission system that can collect power from one or more offshore wind farms in an offshore region, wherein each wind farm delivers wind energy to platform-based voltage-sourced converter stations along a submarine route.

9. The system of claim 8, wherein each wind farm comprises at least one wind turbine generator coupled with at least one AC-to-DC voltage-sourced converter that is in communication with a common HVDC transmission line.

10. The system of claim 9, wherein the HVDC transmission line is bifurcatable between extant substations so as to be brought into communication with corresponding substation that support at least one HVDC voltage-sourced converter that receives electrical energy from the at least one wind turbine generator or one solar plant, with the HVDC transmission line transferring the electrical energy to one or more of the extant substations and any additional substation.

11. A method for enabling multi-functional support of an extant synchronous alternating current (AC) grid, comprising:
   in a system according to claim 1, connecting at least one extant electricity source and at least one extant electricity sink by an HVDC transmission link; and
   selectively and progressively bifurcating the HVDC transmission link into two or more HVDC circuits each comprising one or more 2-terminal transmission links interconnected through one or more HVAC networks.

12. The method of claim 11, wherein each HVDC transmission link may be selected from underground transmission, a combination of overhead and underground transmission and submarine transmission.

13. The method of claim 11, wherein the at least one electricity source comprises one or more generators and the at least one electricity sink comprises a load zone.

14. The method of claim 13, further comprising adding at least one additional generator that complements the one or more generators of the at least one electricity source.

15. The method of claim 11, further comprising placing an AC-DC voltage-sourced converter proximate to the at least one electricity source to absorb reactive power produced thereby, wherein the AC-DC voltage-sourced converter comprises one terminal of a 2-terminal transmission link.

16. The method of claim 11, wherein the HVDC transmission link uses a route comprising one or more of:
   a route passing through at least one intervening HVAC network so as to enable future connections of the HVDC link with the at least one intervening HVAC network;
   a route passing through at least one renewable energy resource zone so as to enable future connections of the HVDC transmission link with HVAC generation ties from the at least one renewable energy resource zone; and
   a route passing through at least one intervening HVAC network where the HVDC link is bifurcated into two or more HVDC transmission links at one or more points of interconnection with the at least one intervening HVAC network so as to enable picking up generation from renewable energy resources in addition to energy from the extant electricity source.

17. The method of claim 16, further comprising bifurcating an HVDC transmission link into two HVDC transmissions links at one or more points of interconnection with one or more intervening HVAC networks, and passing power from one HVDC transmission link to its contiguous link via intervening AC circuitry at an intersection of the HVDC transmission link and its contiguous link.

18. The method of claim 11, wherein the system includes a submarine transmission system that can collect power from one or more offshore wind farms in an offshore region, wherein each wind farm delivers wind energy to platform-based voltage-sourced converters stations along a submarine route.

19. The method of claim 18, wherein each wind farm comprises at least one wind turbine generator coupled with at least one AC-to-DC voltage-sourced converter that is in communication with a common HVDC transmission line.

20. The method of claim 19, further comprising bifurcating the HVDC transmission line between extant substations so as to be brought into communication with corresponding substations that support at least one voltage-sourced converter that receives electrical energy from the at least one wind turbine generator or one solar plant, with the HVDC transmission line transferring the electrical energy to one or more of the extant substations and any additional substation.

* * * * *